United States Patent Office 3,725,020
Patented Apr. 3, 1973

3,725,020
FUEL COMPOSITION FOR PRODUCING
SYNTHESIS GAS OR FUEL GAS
William L. Slater, La Habra, and John C. Ahlborn,
Pomona, Calif., assignors to Texaco Inc., New York,
N.Y.
No Drawing. Continuation-in-part of application Ser. No.
719,229, Apr. 5, 1968. This application Aug. 5, 1970,
Ser. No. 61,396
Int. Cl. C10l 1/00, 1/18
U.S. Cl. 44—50                                    1 Claim

ABSTRACT OF THE DISCLOSURE

Improved fuel composition comprising about 1 to 80 weight percent of an oxygenated hydrocarbonaceous organic material containing about 5 to 60 weight percent of combined oxygen and a carboniferous fuel in the amount of about 20 to 99 weight percent. The subject fuel composition is especially suitable as feedstock for a partial oxidation gas generator for producing synthesis gas or fuel gas.

---

This application is a continuation-in-part of our application Ser. No. 719,229, filed April 5, 1968, which issued as U.S. Pat. 3,556,751 on Jan. 19, 1971.

BACKGROUND OF THE INVENTION

Field of the invention

This invention relates to a fuel composition. More particularly it relates to an improved feedstock fuel for a partial oxidation gas generator for producing synthesis gas or fuel gas.

Description of the prior art

Synthesis gas, a mixture of carbon monoxide and hydrogen, is commonly made by the partial oxidation of a carbonaceous feed by means of a gaseous oxidant such as 95 mole percent oxygen or oxygen-enriched air (45% $O_2$ or more). The raw synthesis gas leaving the reaction zone at a temperature in the range of about 2000 to 3200° F. comprises principally CO and $H_2$, together with minor amounts of $H_2O$, $CO_2$, $CH_4$, $H_2S$, and free unconverted carbon or soot. Further, when the oxidant contains air, the product gas may be diluted with about 50 mole percent of nitrogen. For a more complete description of the synthesis gas process, refer to U.S. Pat. 2,809,104 issued to Dale M. Strasser et al.

Depending upon the operating conditions, about .01 to 10% by weight (basis carbon in the fuel) of unconverted particulate carbon soot may be found entrained in the effluent stream of raw synthesis gas from the reaction zone. Normally, about one to three percent of unconverted particulate carbon is desirable in the effluent gas stream in order to sequester the vanadium and nickel compounds and other ash forming impurities in the oil feed which are corrosive or erosive to the refractory lining of the reaction zone. In conventional processes for manufacturing synthesis gas employing a carbonaceous fuel the amount of particulate carbon entrained in the effluent stream is commonly controlled by regulating the free oxygen supplied to the reaction zone. However there are limitations to this scheme for free oxygen reacts exothermically and when the temperature in the reaction zone gets too high the refractory lining deteriorates.

SUMMARY OF THE INVENTION

A fuel composition comprising about 1 to 80 weight percent of an oxygen containing organic material comprising from about 5 to 60% by weight of combined oxygen blended with about 20 to 99 weight percent of a carbonaceous fuel, preferably for use as feedstock for a synthesis gas generator for producing synthesis gas or fuel gas. For a given soot yield, the effect of adding such oxygenated organic additives in the feedstock is to lower the temperature in the reaction zone of the gas generator and to reduce the free oxygen consumption, for example about 24%. Thus, when about 1 to 80 weight percent of an oxygenated hydrocarbon liquid such as isobutyraldehyde or sorghum molasses is mixed with a liquid hydrocarbon fuel, the normal soot yield of the effluent gas from the reaction zone may be reduced up to about 90%. The oxygenated hydrocarbonaceous organic material is supplied in an amount sufficient to provide a minimum of 0.5 wt. percent of combined oxygen in the feed mixture. Furthermore, it has been unexpectedly found that when the generator is operated to produce an effluent gas having a low yield of unconverted carbon (about 0.3 wt. percent or less, basis carbon in the fuel), the life of the refractory lining of the reaction zone is improved when a heavy fuel oil feed containing an oxygenated organic additive is reacted at a temperature in the range of about 1700° F. to 2800° F. and a pressure in the range of about 1 to 250 atmospheres. Finally, by this process the amount of $CH_4$ in the generator effluent gas may be controlled so as to produce a high B.t.u. fuel gas containing a high percentage of methane at a given level of soot production.

The subject fuel compositions may be also used advantageously as a fuel in liquid or solid form in conventional combustion equipment including burners, heaters, stoves, stokers, furnaces and incinerators. Further, it may be also used as a feedstock in other gas generating processes such as catalytic steam reforming and in reactors.

It is therefore a principal object of the present invention to provide an improved fuel composition. Another object of the present invention is to produce an improved fuel composition which improves the economy and efficiency of the continuous partial oxidation process for producing large volumes of synthesis gas comprising principally hydrogen and carbon monoxide and containing controlled amounts of unreacted carbon and methane.

Still another object of the invention is to produce an improved fuel composition which reduces the soot yield in a synthesis gas process without resorting to an increased consumption of free gaseous oxygen or to higher reaction temperatures.

A further object of the invention is to produce an improved fuel composition for making a high B.t.u. fuel gas or a reducing gas preferably in a conventional free flow noncatalytic synthesis gas generator.

DESCRIPTION OF THE INVENTION

The present invention involves an improved flowable fuel composition which provides improvements in the partial oxidation process for generating hydrogen and CO (synthesis gas), or improvements in the manufacture of reducing gas or in the production of a high B.t.u. fuel gas. About 1 to 80% by weight of oxygenated hydrocarbonaceous organic material is blended with about 20 to 99% by weight of carboniferous fuel to comprise said improved feed composition having a minimum of 0.5 wt. percent of combined oxygen. As feedstock for a conventional feed flow noncatalytic synthesis gas generator, the subject fuel composition unexpectedly and unobviously produces gas at a lower temperature in the reaction zone and with a reduced free oxygen/fuel ratio for a particular $CH_4$/soot ratio.

Liquid or solid oxygenated hydrocarbonaceous organic materials or mixtures thereof which contain about 5 to 60 percent by weight of combined oxygen, e.g., isobutyraldehyde and molasses may be used as a component of our novel fuel composition. Other suitable oxygenated hydrocarbonaceous organic materials include: starch and other carbohydrates, saw dust, wood flour and other cellulosic materials, sludge derived from acid refining petroleum products, organic acids, alcohols, aldehydes, ketones, sewer sludge and organic waste products that have some fuel value and which contain combined oxygen, and waste liquor from paper making processes containing organic solids such as hexose, pentose and lignin. Further, fuel oil which has been pretreated with oxygen or air to introduce oxygen into the oil molecule may also be used.

Most liquid and solid carboniferous fuels or mixtures thereof, suitable for use in the regular partial oxidation process where the fuel is burned or reacted with oxygen in a free-flow noncatalytic synthesis gas generator to produce a mixture of gases comprising principally carbon monoxide and hydrogen at an autogenous temperature in the range of about 1800 to 3000° F. are suitable as a component of our novel fuel composition including: hydrocarbon oil, petroleum coke, tar, various petroleum distillates and liquid hydrocarbon fuels including naphtha, gas oil, residual fuel, reduced crude, whole crude, and fuel oil, also included are slurries of petroleum coke and other solid carbonaceous materials such as bituminous and anthracite coal in water or liquid hydrocarbon fuels. The liquid and solid carboniferous fuels used herein generally contain less than about 5 mole percent of combined oxygen.

Solid components of our fuel composition are ground to a small particle size in order to pass through about 250–325 mesh screen, thereby providing pumpable slurries and assuring substantially complete gasification. Typical slurried fuel compositions may be prepared by mixing together about 5–45 parts by weight of water, 20–90 parts by weight of ground carbonaceous fuel and 5–40 parts by weight of an oxygenated hydrocarbonaceous organic material comprising from about 5 to 60 weight percent of combined oxygen. For example, a suitable fuel composition for making synthesis gas in a free-flow noncatalytic synthesis gas generator is made by mixing together 15–35 parts by weight of water, 30–70 parts by weight of dry powdered petroleum coke, and 15–35 parts by weight of molasses.

Ordinarily, with only water as the slurrying medium, the water/coke ratio is about 1/1 or higher. Surprisingly, however, in the aforesaid embodiment of our invention using molasses in the feed mixture, the water/fuel ratio may be reduced to about 1/3. Further, molasses is soluble in 840 Bunker Fuel to the extent of about 25 or more weight percent of molasses. Adding molasses to slurries of coke in oil assures betted conversion of the coke to synthesis gas without increasing the feed rate of free oxygen.

The use of oxygen-containing organic additives in the feedstock to a synthesis gas generator effects a cost saving by permitting the system to operate with less free oxygen. The system may be operated with a free oxygen/carbon atomic ratio in the range of about 0.500 to 1.20, a steam/fuel wt. ratio in the range of about 0.2 to 1.00, and a pressure in the range of about 1 to 250 atmospheres. By lowering the free oxygen rate, the temperature in the reaction zone may be decreased until methane production becomes appreciable without making an intolerable amount of soot. The methane concentration in the product gas is usually in equilbrium with $H_2$, $H_2O$, $CO$, and $CO_2$, and is a function of temperature and pressure. Further, methane concentration increases as the reaction pressure increases and decreases as the reaction temperature increases. By operating the generator at high pressure (about 1 to 250 atmospheres) and at comparatively lower temperatures (about 1700 to 2500° F.), the methane concentration of the synthesis gas may be controlled at about ten mole percent or more. Since the gross heating value for methane is about 1010 B.t.u./CF while that for $CO$ and $H_2$ is about 321 and 324 B.t.u./CF respectively, it follows that synthesis gas with a high methane content is attractive for use as a fuel gas.

The subject fuel compositions may be also used advantageously as a fuel in liquid or solid form in conventional combustion equipment including burners, heaters, stoves, stokers, furnaces and incinerators. Further, it may be also used as a feedstock in other gas generating processes such as catalytic steam reforming and in reactors, as well as in combustion processes in general wherein a carbonaceous fuel is burned with free oxygen e.g. air, oxygen-enriched air, and preferably substantially pure oxygen (95 mole percent oxygen or higher). However, the subject fuel compositions are preferably reacted with free oxygen in a conventional free-flow noncatalytic synthesis gas generator.

DESCRIPTION OF THE PREFERRED EMBODIMENTS

The following examples are offered as a better understanding of the present invention, but the invention is not to be construed as limited thereto.

EXAMPLE I

The feasibility of using isobutyraldehyde (IBA) as part of the feedstock for a synthesis gas generator may be demonstrated by the data shown in Table I, runs 2 and 3.

Straight California Reduced Crude (CRC) comprises the feedstock for control run 1, whereas the feedstock for runs 2 and 3 are comprised of California Reduced Crude mixed respectively with 48.9 and 73.2 weight percent of IBA. IBA is comprised of about 22 weight percent of combined oxygen.

For a given soot yield, addition of IBA to the liquid hydrocarbon fuel permits operation of the synthesis gas generator at a substantially reduced free oxygen to fuel ratio and at a lower reaction temperature; however, the concentration of methane in the product gas is increased. For example, a comparison of the data for run 1 (0 wt. percent IBA in the feed) with run 2 (48.9 wt. percent IBA in the feed) shows that for both runs by adding IBA to the feedstock and by maintaining a carbon yield in the feed of about 1.2 weight percent and a steam/fuel weight ratio of about 0.37, the free oxygen charged to the generator drops over 19% (7529 s.c.f.h. for run 1 compared with 6303 s.c.f.h. for run 2), the free oxygen consumption (expressed as s.c.f./m.s.c.f. $H_2+CO$) is reduced from 240.2 for run 1 to 232.8 for run 2, and the methane composition of the product gas in mole percent is increased from 0.30 in run 1 to 2.24 in run 2. The temperature in the reaction zone is also lowered from about 2485° F. in run 1 to about 2326° F. in run 2 due to the oxygenated organic additives undergoing endothermic reaction and to the reduction in the amount of free oxygen undergoing exothermic reaction.

By increasing the amount of oxygenated organic additive in the feedstock, such as to 73.2 weight percent IBA in run 3, the soot yield is decreased further to 0.34 wt. percent. Further, the $CH_4$/soot mole ratio increases as the weight percent of IBA additive charged with the fuel increases. In comparison with control run 1, the low soot yield in run 3 is achieved with a lower free oxygen consumption and at a lower reaction temperature. It is believed that the oxygen content of the IBA (22 wt. percent oxygen), and not its volatility, affected the soot yield.

It was unexpectedly found that although the soot production for run 3 was unusually low, there was no evidence of damage to the refractory lining the reaction zone after extended generator operation. Consequently, the amount of unconverted carbon in the effluent stream from the reaction zone may be kept low thereby making it possible to simplify or to eliminate at a substantial cost savings the carbon recovery unit now part of the conventional synthesis gas purification system.

The aforesaid partial oxidation reactions were conducted in a noncatalytic free-flow synthesis gas generator of the type described in U.S. Pat. 2,809,104, issued to Dale M. Strasser et al., wherein the feed is introduced at one end, optionally preheated to a temperature in the range of about 200 to 500° F., and the effluent product gas leaves at the opposite end.

fuel ratio show a greater $CH_4$/soot ratio for any fixed amount of oxygen in the feed.

EXAMPLE III

To demonstrate further the relationship between soot yield vs. combined oxygen in the fuel, straight California Reduced Crude is fed to a synthesis gas generator at 1000

TABLE I

Synthesis Gas Generation

| Run number | 1 | 2 | 3 | 4 | 5 | 6 |
|---|---|---|---|---|---|---|
| Fuel charge: | | | | | | |
| Process fuel, lbs./hr | 629.5 | 622.4 | 629.8 | 435.4 | 442.3 | 451.7 |
| Gravity, °API | 14.4 | 29.4 | 38 | 6.1 | 5.0 | 4.4 |
| Composition, percent by weight: | | | | | | |
| California Reduced Crude (CRC) or Vacuum Residuum (VR) | CRC 100 | CRC 51.1 | CRC 26.8 | VR 100 | VR 95.0 | VR 93.0 |
| Isobutyraldehyde (IBA) or Sorghum Molasses (M) | IBA 0 | IBA 48.9 | IBA 73.2 | M 0.0 | M 5.0 | M 7.0 |
| Oxygen in fuel supplied by IBA or M, Wt. percent | 0 | 11.3 | 16.5 | 0 | 2.6 | 4.3 |
| Process water charge: Process water, lbs./hr | 233.8 | 236.8 | 236.3 | 233.2 | 223.8 | 235.0 |
| Oxygen charge: Free oxygen flow, s.c.f.h | 7,529 | 6,103 | 5,696 | 5,355 | 4,751 | 4,482 |
| Generator operation: | | | | | | |
| Reaction zone temperature, ° F | 2,485 | 2,326 | 2,394 | 2,075 | 1,947 | 1,785 |
| Pressure, p.s.i.g | 1,000 | 1,000 | 1,014 | 1,035 | 1,040 | 1,040 |
| Dry product gas flow, s.c.f.h., forced | 33,505 | 28,384 | 27,902 | 22,719 | 21,184 | 21,620 |
| Composition of product gas, mole percent: | | | | | | |
| $H_2$ | 48.62 | 47.37 | 48.77 | 46.49 | 45.92 | 45.72 |
| CO | 44.93 | 44.96 | 43.37 | 44.38 | 40.37 | 40.55 |
| $CO_2$ | 5.68 | 5.18 | 5.73 | 8.30 | 10.04 | 9.71 |
| $CH_4$ | 0.30 | 2.24 | 1.94 | 0.40 | 3.33 | 3.67 |
| $H_2S$ | 0.34 | 0.13 | 0.07 | 0.23 | 0.24 | 0.25 |
| $N_2$ | 0.02 | 0.02 | 0.02 | 0.12 | 0.02 | 0.02 |
| A | 0.08 | 0.08 | 0.08 | 0.08 | 0.08 | 0.08 |
| Performance: | | | | | | |
| Free oxygen/fuel ratio, s.c.f./lb | 12.0 | 9.8 | 9.10 | 12.3 | 10.7 | 9.9 |
| Steam/fuel ratio, lb./lb | 0.37 | 0.38 | 0.37 | 0.53 | 0.50 | 0.52 |
| Oxygen/carbon ratio, atom/atom | 0.87 | 0.811 | 0.797 | 0.881 | 0.804 | 0.748 |
| Free oxygen consumption, s.c.f./M s.c.f. $H^2$+CO | 240.20 | 232.8 | 221.5 | 259.4 | 259.9 | 240.3 |
| Unconverted carbon (soot yield) wt. percent | 1.2 | 1.2 | 0.34 | 0.82 | 3.71 | 2.62 |
| $H_2$+CO, s.c.f.h | 31,340 | 26,210 | 25,710 | 20,640 | 18,270 | 18,659 |
| Hydrogen/carbon ratio, atom/atom | 2.04 | 2.37 | 2.53 | 2.03 | 2.21 | 2.10 |
| $CH_4$/soot ratio, mole/mole | 0.48 | 3.5 | 11.1 | 0.91 | 1.60 | 2.46 |

EXAMPLE II

The use of sorghum molasses as an oxygenated organic additive to the fedstock for a synthesis gas generator may be demonstrated by the data shown in Table I, runs 5 and 6. Straight Vacuum Residuum (VR) comprises the feedstock for control run 4, whereas the feedstock for runs 5 and 6 are comprised of Vacuum Residuum mixed respectively with 5 and 7 weight percent of sorghum molasses. Sorghum molasses contains about 40 weight percent of combined oxygen.

The effects of charging a synthesis gas generator with a feedstock comprising a liquid hydrocarbon fuel, i.e. heavy fuel oil or vacuum residuum mixed with molasses are similar to those described in Example I for IBA. The methane concentration in the effluent gas from the generator increases as the temperature in the reaction zone decreases and the $CH_4$/soot ratio increases as the weight percent of molasses charged in the feedstock increases. For example by maintaining a $CH_4$ concentration in the product gas of about 3.33 to 3.67 mole percent and a steam/fuel weight ratio of about 0.50–0.52, when 5 wt. percent of molasses in the feedstock of run 5 is increased to 7 wt. percent in run 6 then the soot yield of 3.71 wt. percent in run 5 is reduced to 2.69 wt. percent in run 6, although the free oxygen flow in run 6 (4482 s.c.f.h.) is less than the free oxygen flow in run 5 (4751 s.c.f.h.). Further, the data for runs 4, 5 and 6 demonstrate that both the oxygen/fuel ratio and the free oxygen consumption decrease as the amount of molasses in the feedtsock increases.

The effectiveness of isobutyraldehyde as an oxygenated organic additive in comparison with sorghum molasses may be shown from the data in Table I by means of a semi-log plot showing "weight percent oxygen in the fuel" (supplied by the isobutyraldehyde or by the molasses) as the abscissa and "$CH_4$/soot molecular ratio" as the ordinate. The resulting straight lines show that the $CH_4$/soot ratio for each feedstock increases exponentially with the oxygen content in the fuel. The runs made with molasses vacuum residuum feedstock at a slightly higher steam/fuel ratio show a greater $CH_4$/soot ratio for any fixed amount of oxygen in the feed.

p.s.i.g. and with a 0.38 steam/fuel weight ratio to produce a soot yield of about 3.0 wt. percent (basis carbon in the feed) and 0.46 mole percent of methane. When isobutyraldehyde is charged with the CRC in an amount so that the combined oxygen in the feedstock is about 7 wt. percent, the soot yield in the product gas drops ten-fold to about 0.30 wt. percent. Similarly, straight Vacuum Residuum is fed to a synthesis gas generator operating at 1000 p.s.i.g. with a 0.55 steam/fuel wt. ratio to produce a soot yield of about 3.0 wt. percent and 0.71 mole percent of methane. When sorghum molasses is charged with the vacuum residuum in an amount so that the combined oxygen in the feedstock is about 4.5 wt. percent of oxygen, the soot yield drops about ten-fold to about 0.30 wt. percent of carbon in the feed. Accordingly under the conditions described, molasses was more effective than IBA in reducing the soot yield.

EXAMPLE IV

Fuel gas may be produced by the fuel composition of our invention in a free flow noncatalytic synthesis gas generator operating with a $H_2O$ to fuel ratio of 0.4, a pressure of about 1640 p.s.i.g. a temperature of about 1800° F., and with a feedstock comprised of a 50/50 mixture by weight of heavy fuel oil and IBA. The approximate composition of the product gas in mole percent follows: $CO_2$—4.6, CO—36.1, $H_2$—34.0, $CH_4$—10.0 and $H_2O$—6.2. The gross heating value of the product gas is about 386 B.t.u./c.f. and if desired may be raised by increasing the concentration of high B.t.u. methane. For example, the $CO_2$ may be scrubbed out of the product gas and the CO and $CH_4$ may then be removed as 480/B.t.u./cf. heating gas. The remaining pure $H_2$ may be used for ammonia synthesis or hydrotreating. Alternately, if the CO is shifted first to $CO_2$ and $H_2$, the pure $CH_4$ may be then obtained as one stream and pure hydrogen as a second stream, after scrubbing out $CO_2$. Or, liquid nitrogen may be used for cryogenic cooling in a nitrogen wash system in which said product gas is separated into one stream comprising essentially methane with some nitrogen and CO, and a second stream comprising hydrogen and nitrogen, which may be used as feedstock for ammonia synthesis. Ordinary nitrogen wash plants do not salvage the nitrogen-methane mixture because there is insufficient methane to be worthwhile (only about .2 to .4% of the raw synthesis gas). Now, however, with 10 mole percent or more of methane in the synthesis gas, the nitrogen-methane mixture becomes valuable as a fuel gas.

In summary, our novel fuel composition containing oxygenated organic additives was used as feedstock in a synthesis gas generator as described in the above examples. A product gas was produced having unusually low soot yields, requiring a reduction in the free oxygen feed rate to maintain a desired soot yield. The lower oxygen rate resulted in a lower generator temperature and higher methane content of the synthesis gas. Furthermore, fuel gas may be produced with a methane concentration of about 10 mole percent or more. Thus, the effect of adding oxygenated organic materials to the generator feedstock is to trade off lower reaction temperature and lower oxygen consumption for more methane at a given level of soot production and fixed steam/fuel ratio.

Whereas, the aforesaid oxygenated hydrocarbonaceous organic component of our novel fuel composition is effective in the range of 1 to 80 weight percent, its presence in fuel compositions in the range of about 5 to 75 weight percent is particularly useful. Further, applicants' fuel compositions contain no inorganic oxidizing agents.

The invention has been described generally and by examples with reference to oxygenated organic additives, hydrocarbon fuel feedstocks, effluent gas streams, and various other materials of particular composition for purposes of clarity and illustration only. From the foregoing it would be apparent to those skilled in the art that the various modifications of the materials and the amounts of the materials disclosed herein can be made without departure from the spirit of the invention.

We claim:

1. A liquid fuel composition for producing synthesis gas or fuel gas in a gas generator comprising about 1 to 80 weight percent of an oxygenated hydrocarbonaceous organic material selected from the group consisting of molasses and isobutyraldehyde in admixture with about 20 to 99 weight percent of liquid hydrocarbon fuel oil.

References Cited

UNITED STATES PATENTS

| 3,393,059 | 7/1968  | Webb    | 44—77   |
| 2,210,942 | 8/1940  | Lipkin  | 44—77   |
| 776,365   | 11/1904 | Spelman | 44—51   |
| 2,040,609 | 5/1936  | Holz    | 44—15 R |
| 3,210,168 | 10/1965 | Morway  | 44—51   |
| 2,016,170 | 10/1935 | Mallett | 44—50 X |

CARL F. DEES, Primary Examiner

U.S. Cl. X.R.

44—1 R, 77

UNITED STATES PATENT OFFICE
CERTIFICATE OF CORRECTION

Patent No. 3,725,020  Dated April 3, 1973

Inventor(s) William L. Slater and John C. Ahlborn

It is certified that error appears in the above-identified patent and that said Letters Patent are hereby corrected as shown below:

| | |
|---|---|
| Col. 3, line 51 | "betted" should be --better-- |
| Col. 4, line 47 | "6303" should be --6103-- |
| Table I, Run No. 6, | "2.62" should be --2.69-- |
| | "18,659" should be --18,650-- |
| | "2.10" should be --2.12-- |
| Col. 5, line 47 | "i.e." should be --e.g.-- |

Signed and sealed this 13th day of November 1973.

SEAL)
ttest:

DWARD M. FLETCHER, JR.
ttesting Officer

RENE D. TEGTMEYER
Acting Commissioner of Patents